3,290,720
DEVICE FOR CLEANING FISH
George E. Gordon, 11726 100 Ave.,
Edmonton Alberta, Canada
Filed Jan. 18, 1965, Ser. No. 426,449
2 Claims. (Cl. 17—7)

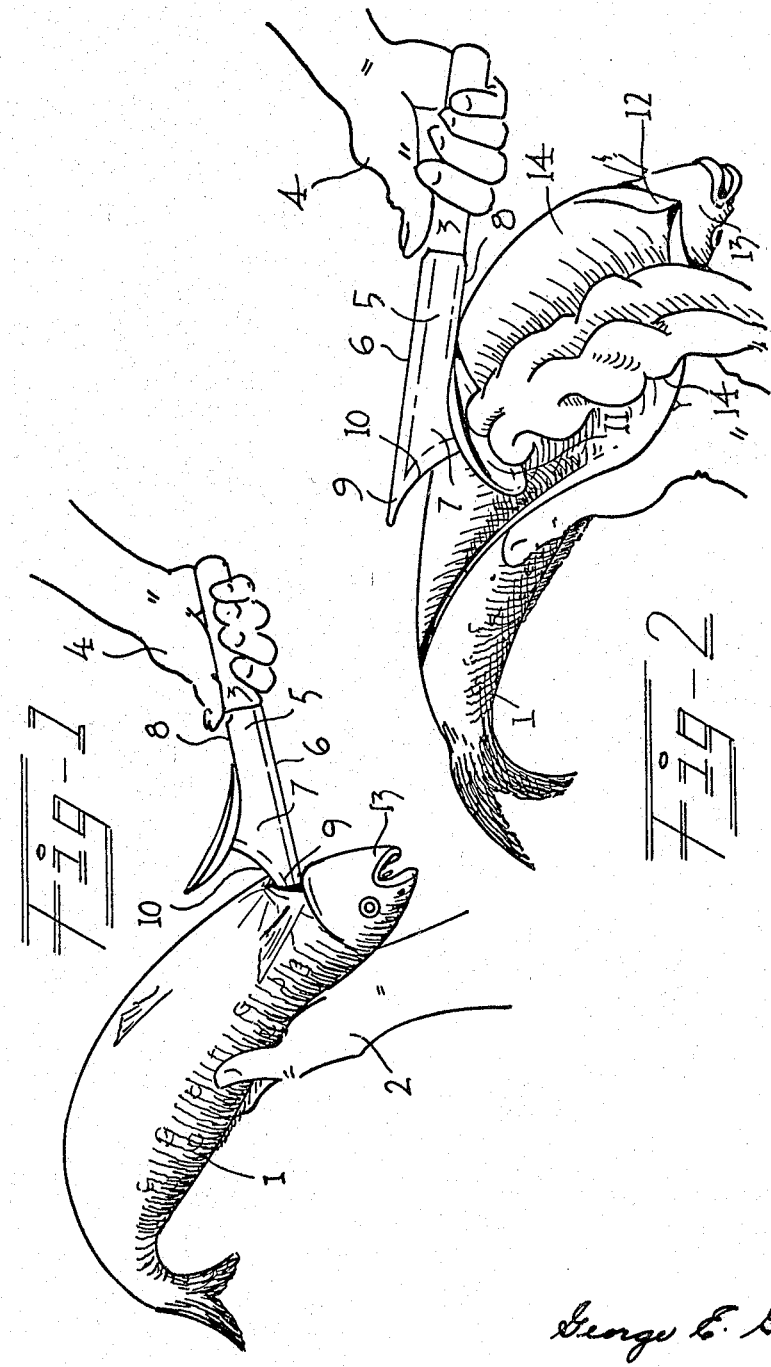

This invention relates generally to fish cleaning devices and particularly to a combined knife and eviscerating tool for this purpose.

In the cleaning of fish, it is common to use a fish knife to slit open the fish and to then use some form of eviscerating tool to clean out the fish. If only one workman is employed, he must first cut open the fish, lay down the knife and then use the eviscerating tool. In some instances if two workmen are employed one can cut open the fish while the other one does the eviscerating but, in any case, there is a multiplication of effort for this operation.

I therefore have developed a device for this purpose that combines a knife and an eviscerating tool with the eviscerating tool secured to the back of the knife and with a web portion connecting the eviscerating tool to the knife and sharpened so that the web portion may be used to slit open the fish. The device then simply is rotated and in the return motion of the arm of the workman, the eviscerating tool will clean out the fish.

With a device of this sort, I have found that a workman can slit open and eviscerate a fish in one continuous motion and, as a result, a considerable increase in the number of fish cleaned and in the quality of the cleaning operation is possible.

In drawings illustrating a preferred embodiment:

FIGURE 1 is a view illustrating a fish with the knife in position for slitting the fish open.

FIGURE 2 is another view of a fish slit open and with the device rotated and being used to eviscerate the fish.

As seen in FIGURE 1 in the drawings a fish 1 is held in the one hand 2 of an operator while the cleaning device which is the subject matter of this invention is held in the other hand 4 of the operator.

The device consists of the blade 5 which is sharpened as indicated at 6 and which has the handle 3 secured firmly at one end of the blade. The blade 5 is formed with a web portion 7 at the back 8 of the blade and toward the forward end or point 9, with the web portion 7 sharpened as indicated at 10.

The eviscerating tool 11 is spoon shaped and is secured rigidly to the back 8 of the blade and the web portion 7 to lie at an acute angle to the forward end 9 of the blade and in a plane transverse to the plane of the blade 5 and web portion 7.

In operation, the sharpened edge 6 of the knife blade is used to make a cut 12 close to the head 13 of the fish and, with the eviscerating tool 11 in the up position, the point 9 is inserted at the cut 12 and the knife pushed forwardly so that the sharpened portion 10 of the web portion 7 will slit open the underside of the fish, as illustrated at 14 in FIGURE 2 in the drawings.

The device is then inverted in the hand of the operator or the hand of the operator may be rotated and the eviscerating tool 11 may then be used to eviscerate the fish as indicated.

With the eviscerating tool 11 secured to the back of the knife 5 at an acute angle to the point of the knife and with the sharpened web portion 7 extending from the back of the eviscerating tool to the point 9 of the knife, it will be seen readily that the fish may be slit open quickly and easily. The device then may be rotated so that the eviscerating tool may be used to clean out the fish with a minimum of time and effort.

What I claim as my invention is:

1. In a tool for cleaning fish, a knife blade having a handle secured at one end thereof and coaxial therewith, a spoon shaped eviscerating tool secured to the back of the knife blade in a plane transverse to the plane of the knife blade and projecting forwardly from the knife blade handle at an angle divergent to the knife blade, such knife blade being formed to a point at its forward end.

2. The tool as claimed in claim 1 wherein the pointed forward end of the knife blade lies ahead of the forward extremity of the spoon shaped eviscerating tool and wherein the knife blade is formed with a sharpened web portion extending from the back of the spoon shaped eviscerating tool to the pointed forward end of the knife blade.

References Cited by the Examiner
UNITED STATES PATENTS

D. 49,368    7/1916   Osterbauer.
2,968,060    1/1961   Eubanks _____ 17—7

FOREIGN PATENTS 416,366    9/1934   Great Britain.

SAMUEL KOREN, Primary Examiner.

ALDRICH F. MEDBERY, Examiner.

H. P. DEELEY, JR., Assistant Examiner.